June 14, 1938.   L. C. FERGUSON   2,120,462
TRACK BOLT WASHER
Filed May 21, 1937
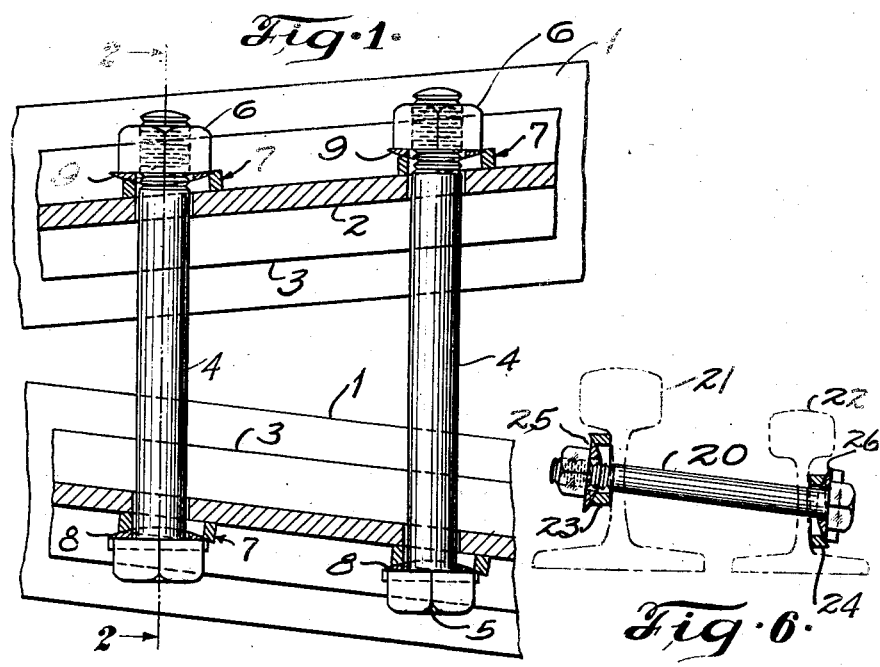
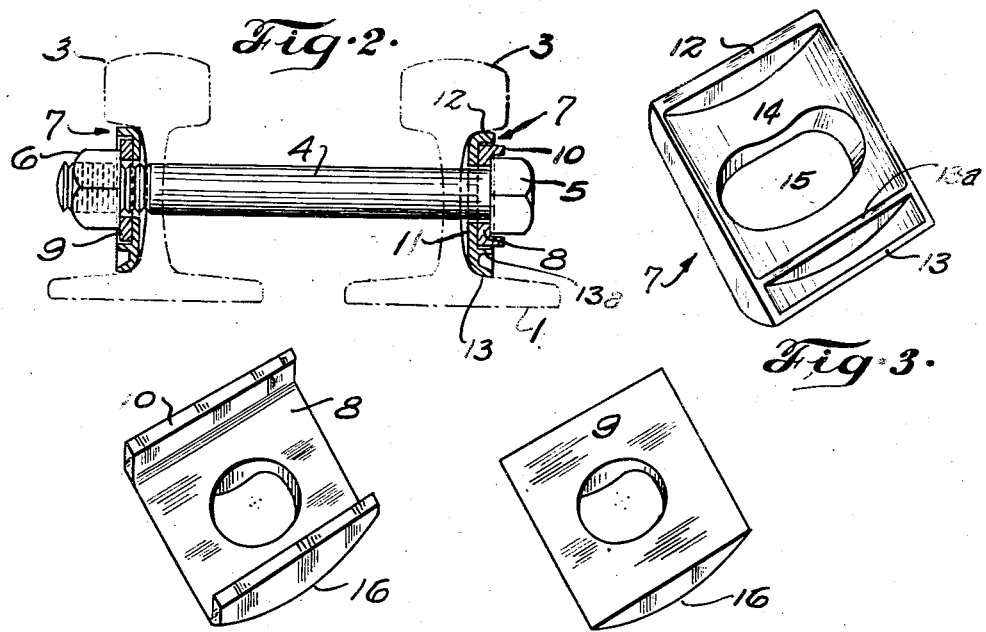
Inventor
Lee C. Ferguson
By Rodney Bedell
Attorney Patented June 14, 1938

2,120,462

UNITED STATES PATENT OFFICE 2,120,462

TRACK BOLT WASHER

Lee C. Ferguson, Marion, Ind., assignor to Chicago Railway Equipment Company, Chicago, Ill., a corporation of Illinois Application May 21, 1937, Serial No. 143,873

2 Claims. (Cl. 246—463)

The invention relates to bolt washer and associated structure, and particularly to such structure involving the bolting together of railway rails so disposed that the axis of the bolt connecting the rails is not perpendicular to the rail web.

Such a disposition is common in railway frog structures and in cross-overs, and in some guard rail installations, and the non-perpendicular relation of the bolt axis and rail web may be due to the rails being at angles to each other, rather than parallel, or may be due to the rails being of different heights or contours. Because of the varying conditions referred to, it has been necessary for the railroads and builders of frogs, cross-overs, etc. to carry a large number of specially designed beveled washers to properly seat the heads and nuts of the different bolts in the many combinations of angles and rail sizes present in different structures. Obviously this is very inconvenient and expensive. Unless the proper beveled washer is supplied and used for each installation, the seat for the bolt head and nut will not be at right angles to the axis of the bolt, the bolting will not be secure, and undesirable strains will be set up in the bolt and its nut.

The object of the present invention is to reduce the parts necessary to be carried on hand to meet the various conditions indicated; to facilitate the bolting operation, and to assure a true bearing of the bolt head and nut against the rail and a correspondingly true bearing of the nut on the bolt threads.

These objects are attained by the structures shown in the accompanying drawing illustrating the invention in which—

Figure 1 is a top view of two bolts applied to angularly disposed rails, as in a switch or frog structure, parts of the rails and the bolt washers being sectioned for clearer illustration.

Figure 2 is a vertical transverse section taken on the line 2—2 of Figure 1.

Figure 3 is a perspective of one of the washer parts looking at the interior face thereof.

Figure 4 is a perspective of another washer part adapted to cooperate with the part shown in Figure 3.

Figure 5 is a perspective of another washer part adapted to be used in cooperation with the part shown in Figure 3 in place of the part shown in Figure 4.

Figure 6 is a section corresponding to Figure 2 but illustrating a different bolt and rail relationship.

Each of the rails illustrated in Figures 1 and 2 is a typical cross section and comprises a base flange 1, an upright web 2, and a head 3. Each of the bolts comprises a shank 4 and a head 5 and is provided with a nut 6. All of the above mentioned parts are of familiar construction and in themselves do not constitute the present invention.

To form a bearing for the bolt head and nut which is square or at right angles to the axis of the bolt, there is provided a two-part washer between the rail web and the bolt head or nut. Each of these washers includes a substantially flat dish-like shoe member 7 applied to the rail and a substantially plano-convex rocker member slidable over the concave inner face of shoe member 7 throughout an angle of approximately twenty-five degrees.

Each shoe 7 has an exterior face 11 arranged to be set against the rail web and has upper and lower marginal edges or flanges 12 and 13 arranged to oppose respectively the underside of the rail head or the upper face of the rail flange. An intermediate flange 13a may be provided or omitted as indicated below. Since the pull of the bolt will be square with the general plane of the washer, it is unnecessary for the washer to snugly fit the rail contour. The inner face 14 of the shoe is arched concavely from edge to edge of the shoe preferably in the form of a segment of a cylinder. An opening 15 extends through the shoe and is elongated laterally as shown.

The rocker member may be as shown at 8 (Figure 4) or as shown at 9 (Figure 5), the first form 8 being intended primarily for application to the head end of the bolt and provided with ribs 10 for engaging the sides of the head to prevent its rotation. The second form 9 omits ribs 10, leaving a flat outer surface on which the nut may be rotated. Obviously the ribbed member may be used beneath the nut and the rib-less member beneath the head if for any reason it is desired to turn the bolt while the nut is held stationary. Rockers 9 and 10 are each provided with a substantially circular hole which will register with a portion of hole 15 in the shoe when the parts are assembled.

The inner faces of rockers 8 and 9 are arched convexly as indicated at 16. The height of rockers 8 and 9 corresponds roughly to the distance between flanges 12 and 13a of shoe 7. Accordingly, inner faces 16 of rockers 8 and 9 may slide over the inner faces 14 of shoes 7, transversely of the bolt axis, to produce varying angles between the flat outer faces of the two assembled members, rockers 8 and 9 being guided in their sliding movement by the flanges on shoes 7.

It is apparent by assembling and adjusting the washer parts as indicated above, the outer faces of the washers at opposite ends of the bolt may be moved to parallel positions, irrespective of the angle between the rails, whereby the stresses are applied to the bolt throughout the under surface of the head and nut and in alignment with or parallel to the bolt axis. The washers do not project a great distance from the rail web and, indeed, are beneath and protected by the rail head.

The devices are simple in construction and economical to produce and use of five sizes of rail engaging shoes and three sizes each of washer rockers and head lock washers will eliminate the necessity of stocking about a hundred different sizes and heads of ordinary solid washers and the necessity of selecting from such an assortment the proper washer for each application.

It is not essential to the successful use of the device that all the details described be included. For instance, the rail section shown corresponds to what is generally known as a "130 lb. p. s." section. In a lighter section, such as a "90 lb. A. S. C. E." section, the distance between the head and flange would be so much less than that illustrated that the upper and lower flanges 12 and 13 would be close enough to each other to prevent the bolt head from turning and the additional rib 13a would be omitted. If a heavier rail, such as a "131 R. E." section were used, then the washer might require another rib such as 13a but spaced from the top flange 12. Again, the distance between the bolt hole and the rail head or flange may make unnecessary the provision of a head engaging rib on the rocker washer member.

Figure 6 illustrates an assembly in which the bolt 20 is inclined in a vertical plane relative to the webs of the rails 21 and 22 due to the fact that the rails, although they may parallel each other, are of different heights. With this arrangement the washer assemblies will be rotated ninety degrees from that shown in Figures 1 and 2 so that the arcuate contour of the shoes 23 and 24 extends vertically instead of horizontally and the curved portions of the rockers 25 and 26 extend in a similar direction. This facilitates the provision of a square bearing for the under-side of the bolt head and nut with all the advantages previously stated.

As indicated above, some of the elements described may be omitted without departing from the spirit of the invention and exclusive use of such modifications as come without the scope of the claims is contemplated.

I claim:

1. A shallow track bolt washer for application to an individual bolt and only slightly exceeding the area of the bolt head or nut and comprising a shoe and a rocker, said shoe having an exterior face shaped to contact the rail web and provided with upwardly and downwardly directed edge portions arranged to oppose the rail head and flange, said shoe having an arcuate interior face, and said rocker having an opposing inner face shaped to fit against and slide over said shoe interior face transversely of the bolt axis, said rocker having a flat outer face for seating a bolt head or nut element, said shoe having spaced flanges on its interior face for guiding said rocker in its sliding movement over said shoe, and said rocker having spaced ribs on its outer face for engaging the sides of a bolt head or nut to prevent rotation thereof.

2. A track bolt washer comprising two shallow plate-like parts with abutting inner faces and oppositely directed outer faces which are substantially flat and square and only slightly larger in area than the head or nut of the bolt, the outer face of one part being arranged to oppose a rail web and having upper and lower margins arranged respectively to oppose the under side of a railway head and the upper side of a rail flange adjacent their juncture with the rail web, there being parallel flanges on the interior face of said part, and the other part slidably fitting between said flanges and having a flat outer face, the abutting faces of said parts being of concavo-convex arrangement and movable over each other to different positions to position said latter mentioned part to provide a flat bolt head or nut engaging surface at varying angles to said rail abutting face, said second mentioned part having ribs on its outer face paralleling and slidably engaging the flanges on the first-mentioned part and spaced apart to receive between them a bolt head or nut to prevent the same from turning.

LEE C. FERGUSON.